United States Patent
Ng et al.

(10) Patent No.: US 8,331,743 B2
(45) Date of Patent: Dec. 11, 2012

(54) RECONFIGURABLE OPTICAL FILTERS FORMED BY INTEGRATION OF ELECTRICALLY TUNABLE MICRORESONATORS

(75) Inventors: Willie W. Ng, Agoura Hills, CA (US); Brian N. Limketkai, Santa Monica, CA (US); Robert R. Hayes, Calabasas, CA (US); Daniel Yap, Newbury Park, CA (US); Peter Petre, Oak Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 946 days.

(21) Appl. No.: 12/183,064

(22) Filed: Jul. 31, 2008

(65) Prior Publication Data
US 2009/0208209 A1 Aug. 20, 2009

Related U.S. Application Data

(60) Provisional application No. 61/028,625, filed on Feb. 14, 2008.

(51) Int. Cl.
*G02B 6/12* (2006.01)

(52) U.S. Cl. ........... 385/14; 385/27; 385/31; 385/40; 385/131; 385/2

(58) Field of Classification Search ............ 385/14, 385/27, 31
See application file for complete search history.

(56) References Cited

U.S. PATENT DOCUMENTS

| | | | |
|---|---|---|---|
| 5,327,215 A | 7/1994 | Bernard et al. | |
| 6,668,006 B1 | 12/2003 | Margalit et al. | |
| 8,019,185 B2 | 9/2011 | Yap | |
| 2004/0114867 A1* | 6/2004 | Nielsen et al. | 385/40 |
| 2005/0286602 A1* | 12/2005 | Gunn et al. | 372/94 |
| 2006/0083456 A1 | 4/2006 | Burns et al. | |
| 2006/0215949 A1 | 9/2006 | Lipson et al. | |
| 2007/0009205 A1* | 1/2007 | Maleki et al. | 385/27 |
| 2009/0034905 A1* | 2/2009 | Ty Tan et al. | 385/14 |
| 2010/0158429 A1* | 6/2010 | Popovic | 385/3 |

OTHER PUBLICATIONS

U.S. Appl. No. 12/560,409 to Ng, pending, unpublished (filed Sep. 15, 2009), commonly assigned with present patent application.
U.S. Appl. No. 12/763,965 to Ng et al., pending, unpublished (filed Apr. 20, 2010), commonly assigned with present patent application.
Alfred Driessen et al., "Microresonators as promising building blocks for VLSI photonics," Integrated Optics: Theory and Applications, edited by Pustelny et al., Proc. of SPIE vol. 5956, 59560Q, 2005, Warsaw, Poland.

* cited by examiner

*Primary Examiner* — Hemang Sanghavi
(74) *Attorney, Agent, or Firm* — O'Connor & Company (57) ABSTRACT

The present invention describes a microresonator that can be used as a 1:f variable coupler in a unit cell. It is described how a cascade of unit cells can be used to form a tunable, higher-order RF-filter with reconfigurable passbands. The disclosed filter structure can be utilized for the narrowband channelization of RF signals that have been modulated onto optical carriers. It is also disclosed how to utilize add/drop capabilities of the contemplated microdisks to confer connectivity and cascading in two dimensions. The present invention can conveniently provide a wavelength division multiplexing router, where an array of unit cells as provided herein can form a programmable optical switching matrix, through electronic programming of filter parameters.

11 Claims, 11 Drawing Sheets

RECONFIGURABLE OPTICAL FILTERS FORMED BY INTEGRATION OF ELECTRICALLY TUNABLE MICRORESONATORS

PRIORITY DATA

This patent application claims priority under 35 U.S.C. §120 from U.S. Provisional Patent Application No. 61/028,625, filed Feb. 14, 2008, which is hereby incorporated herein by reference for all purposes.

FIELD OF THE INVENTION

The present invention generally relates to communication systems, and relates more specifically to methods and devices for optical filtering using programmable microresonators.

BACKGROUND OF THE INVENTION

The ever-increasing demand for broadband communication systems has led to optical-transmission systems based on optical waveguides such as fiber optics and optical processing elements for use in these systems. Generally, in high-performance communication systems, photons continue to supplant electrons as messengers.

Significant effort has been spent towards optical integrated circuits with high complexity and advanced functionality. As is described in Driessen et al., *Proc. of SPIE* Vol. 5956, 2005, which is hereby incorporated by reference herein, optical "microresonators" can be considered as promising building blocks for filtering, amplification, switching, and sensing. Active functions can be obtained by monolithic integration or a hybrid approach using materials with thermo-optic, electro-optic, and optoelectronic properties and materials with optical gain. Driessen does point out that there is a need for "better design tools for single devices as well [as] systems" among other needs.

In a common configuration in microresonator-based sensors, a microresonator is placed in close proximity to an optical waveguide such as an optical fiber whose geometry has been specifically tailored—for example, tapered or etched to a size of 1-5 microns. The tapering modifications to the waveguide result in a substantial optical field outside the waveguide, so that light can couple into the microresonator and excite its eigenmodes. These eigenmodes may be of various types, depending upon the resonant cavity geometry.

For spherical and disk cavities, the modes of interest for sensing applications are usually the so-called "whispering gallery modes" (WGMs), which are traveling waves confined close to the surface of the cavity. Since the WGMs are confined near the surface, they are well-suited to coupling with optical fibers, optical waveguides or analytes placed on or near the surface.

For ring cavities based on single-mode waveguides, the modes are those of the single-transverse-mode channel waveguide, under the constraint that the round-trip path traversed corresponds to an integral number of wavelengths. Other cavity geometries, such as Fabry-Perot resonators using single-mode waveguides with Bragg grating reflectors, or multimode rectangular cavities, have familiar standing-wave resonances as their eigenmodes.

In U.S. Pat. No. 7,215,848, Tan et al. disclose an optical isolator for coupling light from a first optical waveguide to a second optical waveguide. The optical isolator utilizes a microresonator coupled to the first and second optical waveguides.

MacFarlane and co-workers describe an active lattice filter structure for use in optical signal processing (Kannan et al., *IEEE Journal of Lightwave Technology*, Vol. 24, No. 71, 2006; Hunt et al., *EURASIP Journal on Applied Signal Processing*, 2005:10). In these filters, certain filter parameters ($K_i$ and $t_i$ according to the nomenclature of the present invention) were fixed after the filter was constructed, leaving gain as the only available vehicle for programming the filter's response. It would be beneficial if $K_i$ and $t_i$ could be made to be tunable.

In the art, it has been typically necessary to resonantly couple multiple microdisks placed in close proximity to each other, so as to obtain "flattened" passbands from the intrinsic Lorentzian passbands of the microdisks or Fabry-Perot resonators (see, for example, Little et al., *IEEE J. of Lightwave Technology*, Vol. 15, No. 6, 1997).

Also, in Jinguji, *IEEE J. of Lightwave Technology*, Vol. 14, No. 8, 1996, as well as Madsen, *IEEE Photonic Technology Letters*, Vol. 10, No. 8, 1998, passive filters are constructed from micro-rings that are not programmable. Because variable coupling between the waveguide-interconnects and micro-rings is not available in these structures, neither two-dimensional connectivity nor passband reconfiguration can be readily achieved in the filters described by Jinguji and Madsen.

In view of the shortcomings in the art, there is a need for methods that provide for reversible adjustment of optical-filter parameters, thereby addressing the aforementioned call for better design tools pertaining to the use of microresonators. What is needed is a heterogeneously integrated filter structure that is suitable for controlling the transfer of optical power between the microresonator and the waveguide in an efficient (low loss) fashion, and for tuning of resonance frequencies.

Improvements should also set forth the manner of making and using the filter in practical devices and systems, such as those that employ channelization. "Channelization" refers to the filtering or division of a broadband signal (such as radio frequency) into narrower frequency-bands, or channels.

In defense-related systems, one can encounter threats over a broad spectrum of radio frequencies. The systems need to cover the entire spectrum, with sufficient selectivity to separate simultaneously received signals that are closely spaced in frequency. These requirements can be met through channelization.

Therefore, in view of the above-described shortcomings, there is a further need in the art for filtering methods and filter structures that can be utilized for narrowband channelization of radio frequency signals that have been modulated onto optical carriers. These filtering methods should enable the filtering of radio-frequency (RF) signals in the optical domain, i.e. filtering the RF signals without demodulating it from the optical carrier.

SUMMARY OF THE INVENTION

The present invention addresses the aforementioned needs in the art, as will now be summarized and further described in detail below.

A first aspect of the invention provides an optical filter comprising a plurality of unit cells, wherein each unit cell comprises at least two microresonators, and wherein each microresonator is coupled to at least one optical waveguide. In some embodiments, each unit cell comprises two microresonators, and each microresonator is coupled to two optical waveguides. In some embodiments, the passbands are reconfigurable. In preferred embodiments of the optical filter, the coupling is achieved by heterogeneous integration via wafer-bonding, such as oxide-bonding.

A second aspect of the invention describes each unit cell. In some variations, the unit cell of the invention comprises two active microdisks, two active phase shifters, and at least one input/output optical coupler. In some embodiments, the microdisks include electrodes for coupling-control and for tuning of resonance frequencies. Each microdisk can provide a throughput and a dropped output, thereby providing a programmable first-order infinite impulse response filter. The microdisks can be fabricated from semiconductor materials, such as Si. The phase shifters can also be fabricated from semiconductor materials, such as Si.

In preferred embodiments of the unit cell in this second aspect, the microdisks and the phase-shifters are heterogeneously integrated to waveguides. The coupling is achieved by heterogeneous integration via wafer-bonding, such as oxide-bonding. Preferably, optical coupling between each microdisk and waveguides can be varied by carrier injection at coupling junctions. In some embodiments, the unit cell further comprises a second pair of electrodes wherein the resonance frequency of the microdisks can be tuned by localized carrier injection at the second pair of electrodes.

In a third aspect of the present invention, a unit cell is described suitably for second-order infinite impulse response filtering, the unit cell comprising at least two microdisks, at least two phase shifters, and at least two input/output optical couplers, and PIN diodes (i.e., an effective number of PIN diodes). In some variations, the filter coefficients can be programmed by tuning (i) the coupling between the microdisks and waveguides, (ii) the differential phase shift, (iii) the round-trip transmission inside the microdisks, and (iv) variable optical splitting or combining at the input/output optical couplers. The coefficients can be programmed electrically.

The unit cells relating to this third aspect comprise active Si microdisks that include throughput-ports and drop-ports, wherein the microdisks are suitable for input/output variable-coupling. In some embodiments, the input/output couplers comprise directional couplers formed in waveguides. By selecting the appropriate characteristics of the filters through the signals applied to the electrodes, the unit cell can function as a switch to route the optical signal. Preferably, the reconfiguration time of the infinite impulse response filtering is less than about 100 nsec.

A fourth aspect of the present invention provides an optical filter comprising a plurality of unit cells, wherein each unit cell comprises at least two microresonators, wherein each microresonator is coupled to at least one optical waveguide, and further wherein each unit cell comprises a unit cell according to the second and/or third aspects of the invention.

In a fifth aspect, the present invention discloses an infinite impulse response optical filter, comprising a plurality of unit cells configured with two-dimensional connectivity. The two-dimensional connectivity is notably suitable to control coupling to the throughput and drop ports in active microdisks of the unit cells. In some embodiments, the filter comprises at least two different types of unit cells. For example, the different types of unit cells can be placed along different rows of a lattice to be cascaded for passband synthesis. The filter can be suitable for supporting unit-cell redundancy, whereby at least one bad unit cell can be bypassed when an optical signal is routed to a neighboring row that includes unit cells of the same design of the bad unit cell.

A sixth aspect of the invention describes a device comprising a frequency channelizer capable of selecting a plurality of frequency segments of an incoming broadband signal, wherein the device comprises an optical filter according to any of the preceding aspects.

A seventh aspect of the invention teaches the characteristics of a new microresonator device comprising (a) a microdisk, (b) a first electrode located over an output optical waveguide, (c) a second electrode located over an input optical waveguide, and (d) a third and fourth electrode located between input and output optical waveguides. In some embodiments, the second and third electrodes can control the optical coupling with the input optical waveguide. In embodiments, first and fourth electrodes can control the optical coupling with the output optical waveguide. In the microresonator device of this seventh aspect, in certain embodiments, each electrode contacts a $P^+$ region or a $N^+$ region of the semiconductor, thereby forming a PIN diode at each electrode of the microresonator. In preferred microresonator devices, each electrode is adapted to receive an applied voltage, wherein a pair of electrodes can control coupling between a waveguide and a microresonator.

In an eighth aspect, a cascade of optical filters, according to any of the preceding aspects, forms an infinite impulse response filter system. The infinite impulse response filter system preferably forms a higher-order filter. In some embodiments, the optical filters are cascaded vertically in a manner suitable to filter at least two input signals.

In a ninth aspect of the invention, a method is provided for constructing higher-order filters with electrically reconfigurable passbands, the method comprising:

(i) providing a plurality of unit cells that can be coupled;

(ii) determining optical parameters to realize a Z-domain filter, such as $\theta$, $\phi$, $\alpha$, t, $\psi$, and $\delta$;

(iii) mapping the Z-domain filter back to the analog domain, thereby obtaining a frequency filter response; and (iv) repeating steps (ii) and (iii) for at least one other desired Z-domain filter.

A tenth aspect relates to a method for optical filtering, the method comprising providing a plurality of unit cells, wherein each unit cell comprises at least two microresonators, and wherein each microresonator is coupled to at least one optical waveguide. Preferably, each unit cell comprises two microresonators, and each microresonator is coupled to two optical waveguides. As explained elsewhere herein, the coupling can be achieved by heterogeneous oxide-based bonding.

An eleventh aspect of the invention provides methods for optical filtering comprising use of a filter, unit cell, or microresonator device according to any of the preceding aspects that disclose, respectively, a filter, unit cell, or microresonator device.

The methods of the invention can enable channelization of a radio frequency signal or other broadband signal, in a twelfth aspect. These methods can include (in some embodiments) a first search using a broad passband and a second search using a narrower passband. In certain embodiments, these methods of the twelfth aspect can include tuning of the filter passband from a first center frequency to a second center frequency.

In a thirteenth aspect, the present invention enables a router for wavelength division multiplexed systems, the router comprising:

(i) means for sensing the wavelength of a channel carrier from a WDM transmitter at a source;

(ii) means for placing the information from the designated channel to the intended WDM receiver destination; and (iii) a programmable optical switching matrix comprising a plurality of unit cells each including two microdisks, two phase shifters, and at least one input/output optical coupler, wherein the microdisks and the phase-shifters can be heterogeneously integrated to waveguides. Preferably, the coupling between the microdisks and waveguides can be controlled to switch the signals propagating within the waveguides.

A fourteenth aspect of the invention provides a method of wavelength division multiplexing, the method comprising:

(i) providing a router capable of sensing information comprising wavelengths within a channel carrier from a WDM transmitter at a source and further capable of placing said information to a WDM receiver destination;

(ii) providing a cascade of unit cells each including two microdisks, two phase shifters, two waveguides, a PIN diode, and at least one input/output optical coupler, thereby forming a programmable optical switching matrix; and (iii) programming said programmable optical switching matrix from (ii) to route and combine a first plurality of optical inputs to a second plurality of optical outputs.

These and other aspects, variations, and embodiments of the present invention will become apparent by reference to the detailed description below.

BRIEF DESCRIPTION OF THE DRAWINGS

FIG. 8a: Butterworth filter formed by cascading 8 unit cells. FIG. 8b: Elliptic filter formed by cascading 5 unit cells.

DETAILED DESCRIPTION OF EMBODIMENTS OF THE INVENTION

The apparatus and methods of the present invention will now be described in detail by reference to various non-limiting embodiments of the invention.

Unless otherwise indicated, all numbers expressing dimensions, frequencies, efficiencies, and so forth used in the specification and claims are to be understood as being modified in all instances by the term "about." Without limiting the application of the doctrine of equivalents to the scope of the claims, each numerical parameter should at least be construed in light of the number of reported significant digits and by applying ordinary rounding techniques.

An optical microresonator ("microresonator" or "microdisk" as used herein) is a known integrated optics structure with resonant optical coupling and feedback that allows a variety of functions such as filtering and optical switching.

Certain preferred embodiments of the present invention will now be described in more detail, by reference to the accompanying figures. The figures are understood to provide representative illustration of the invention and are not limiting in their content. It will be understood by one of ordinary skill in the art that the scope of the invention extends beyond the specific embodiments depicted. This invention also incorporates routine experimentation and optimization of the methods, apparatus, and systems described herein.

In these figures, a small number of features (microresonators, waveguides, etc.) are depicted for ease of illustration. In practice, more such features will likely (although not necessarily) be utilized in a given embodiment. Figures are not necessarily drawn to scale.

Figure 1:
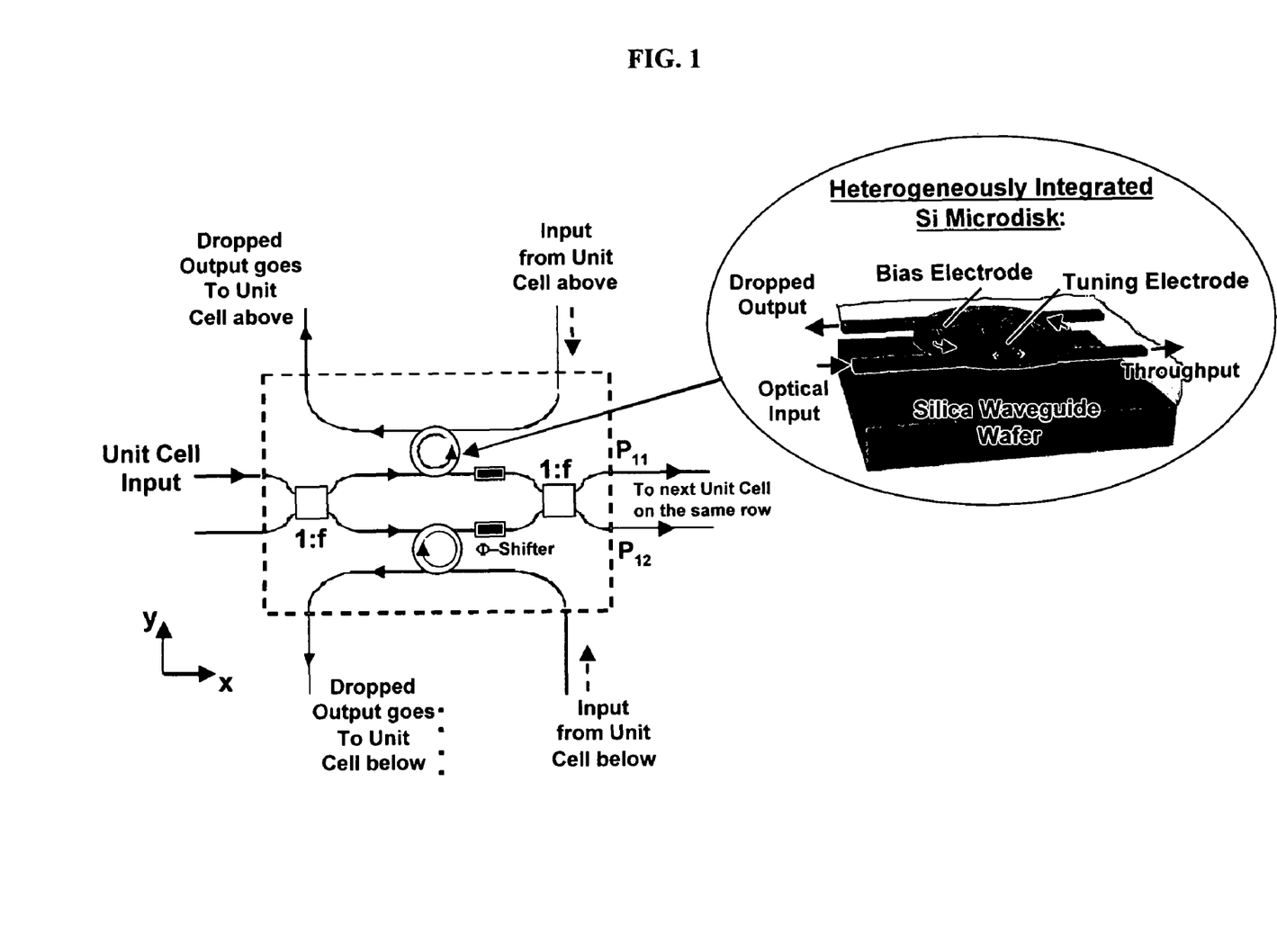
FIG. 1 is a schematic of a unit cell of the invention in some embodiments.

Reference can first be made to FIG. 1, which is a schematic of a unit cell of the invention in some embodiments. In this embodiment, active Si microdisks are heterogeneously integrated with a wafer of low-loss silica waveguides underneath. The heterogeneous integration is shown here to be by vertical coupling, which is preferred. The schematic of FIG. 1 also illustrates two-dimensional connectivity made possible by the add/drop capabilities (which are further explained below) of the Si microdisks in the unit cell. The inset of FIG. 1 shows the use of electrical tuning to accomplish programmability of the filter's passband; programmability will be described more fully hereinafter.

The heterogeneous integration can be accomplished with the use of wafer-bonding, such as oxide bonding. Various known bonding methods may be used. In variations, the bonding process can be activated by temperature, a plasma, certain chemicals, or by some other means. A variety of wafer bonding methods are described in the book, *Semiconductor Wafer Bonding, Science and Technology*, authored by Q.-Y. Tong and U. Gosele, published by John Wiley and Sons (1999), which is hereby incorporated herein by reference.

One method of bonding is anodic bonding (electrostatic bonding). The wafer and substrate are brought together and heated to a high temperature. A large electric field is applied across the joint, which causes an extremely strong bond to form between the two materials. Other bonding methods include using an adhesive layer, such as a glass, or photoresist. A certain bonding technique makes use of a film of borosilicate glass (BSG) to achieve the bonding. This approach is described in *J. Crystal Growth*, Vol. 195, 1998.

Still another bonding technique makes use of spin-on glass as the interface material. This approach is described in *Electronics Letters*, Vol. 36, 2000. The spin-on glass film may be deposited on either surface, but it may be more convenient to deposit that film on the optical waveguide layer. Typical spin-on glass film thicknesses are in the hundreds of nanometers. The bonding is done at room temperature and the substrate is annealed at temperatures ranging from 200-225° C., for example. It is also possible to bond wafers directly together using gentle pressure (direct bonding).

The heterogeneous integration is preferably accomplished via oxide-bonding, which is common and will be understood by the skilled artisan. Before bonding, the exposed waveguide layer surface may be (but is not necessarily) polished to ensure that it is flat and cleaned to remove any particles or residue.

As illustrated in FIG. 1, light is vertically coupled from the input/output waveguides into Si microdisks designed preferably with both tuning- and bias-electrodes. By controlling the thickness of the evanescent-coupling layer, one can attain a high degree of reproducibility in setting the coupling between microdisk and waveguides. Vertical coupling allows ultra-low loss (<0.05 dB/cm) silica waveguides to be integrated heterogeneously with tunable semiconductor microresonators. This, in turn, enables a higher signal-to-noise ratio and "spur-free" (spurious-free) dynamic range at the output end of a radio frequency-photonic filter.

Figure 2:
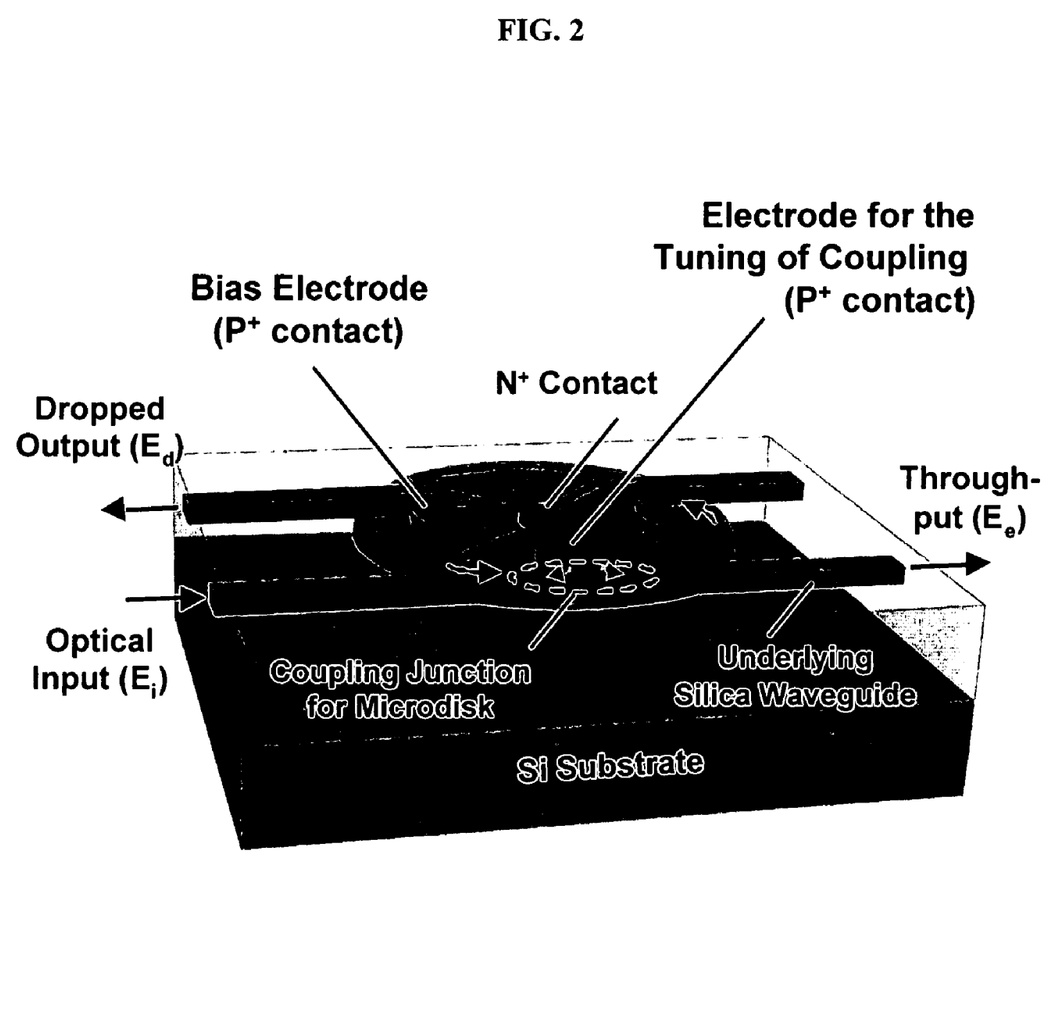
FIG. 2 depicts the design details for tuning- and bias-electrodes, according to some embodiments of a tunable microdisk.
Figure 3:
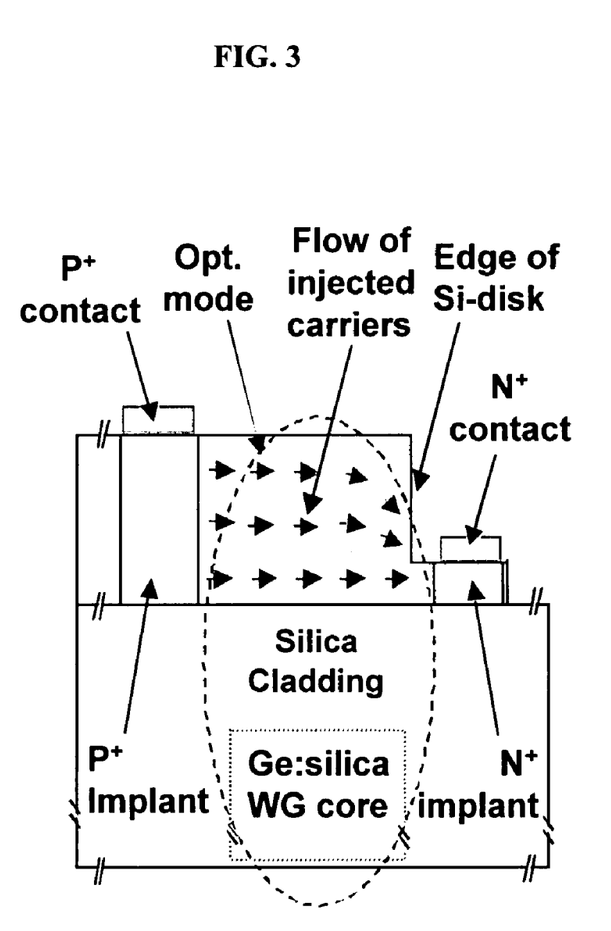
FIG. 3 shows a cross section of the coupling junction between microdisk and silica waveguide, looking into the optical input waveguide shown in FIG. 2.

FIGS. 2 and 3 depict the design details for tuning- and bias-electrodes, according to some embodiments of a tunable microdisk. FIG. 2 shows a vertically coupled Si microresonator with contact electrodes designed for the tuning of resonance frequencies and coupling. It is noted that in FIG. 2, the disk is flat on the silica cladding, which can be preferable in some embodiments but is by no means the only manner of adjacency between disk and silica (or other material).

FIG. 3 shows a cross section (looking into the optical input waveguide of FIG. 2) of the coupling junction between microdisk and silica waveguide. This illustration shows how carrier injection could be used to control $\Delta n_{eff}$ (and hence controls evanescent coupling). Light is vertically coupled from the Ge:silica waveguide core to the Si microdisk, and vice versa. The silica cladding must have a lower refractive index than the Ge-doped waveguide core for waveguiding to occur.

A waveguide-core of Ge-doped silica, surrounded by silica cladding, is preferred because it is known to be characterized by a low waveguide loss (per length basis). The level of Ge doping can be about 0.5-3%, such as that employed in commercial devices, or some other level of Ge doping. Other dielectric waveguides can be used, including for example $Si_xN_y$ cladded by silica, or silicon oxynitride (SiON) cladded by silica, among other possibilities as will be appreciated.

FIG. 3 shows the formation of a PIN diode from two contacts and two doped regions, a $P^+$ and an $N^+$ region. In some embodiments, the thickness of the silica cladding layer between the optical waveguide and the silicon disk microresonator, along with the voltage applied to the PIN diodes, can control the coupling between the optical mode of the microresonator and the waveguide. To best control evanescent coupling of the optical mode into the microresonator, the thickness of the silica cladding is preferably less than about 10 microns. This coupling is varied through the injection of carriers from the PIN diodes to effectively change the index of refraction locally through the Kramers-Kronig relationship.

An evanescent wave is a nearfield standing wave exhibiting exponential decay with distance. Evanescent waves are formed when sinusoidal waves are (internally) reflected off an interface at an angle greater than the critical angle so that total internal reflection occurs. The physical explanation for their existence is that the electric and magnetic fields cannot be discontinuous at a boundary, as would be the case if there were no evanescent field. Practically speaking, evanescent coupling means that the optical mode of the light traveling through the waveguide extends vertically into the microresonator.

As illustrated in FIG. 2, two silica input/output waveguides are vertically coupled to a Si microdisk. In the figure, the optical input ($E_i$) is resonantly coupled into the microdisk via use of its front coupling-junction. The throughput and dropped-output (from the back waveguide) of this four-port device are denoted as $e_e$ and $E_d$, respectively.

The power P(z) is important, where z is the dimension into the optical waveguide, i.e. into the paper in FIG. 3. The power evanescently coupled into (or out of) the microresonator from a power input $P_i$ can be modeled as a directional coupler that has coupling-constant $\kappa_C$ and interaction length $L_C$:

$$P(L_c) = \left(\frac{\kappa_c^2}{\kappa_c^2 + (\Delta\beta/2)^2}\right) \cdot \sin^2\left(\sqrt{\kappa_c^2 + \left(\frac{\Delta\beta}{2}\right)^2}\, L_c\right) \cdot P_i \qquad (EQ.\ 1)$$

In EQ. 1, $\kappa_C$ is given by an overlap integral between the mode circulating in the microresonator and its input/output waveguide (units of inverse length), and $\Delta\beta$ is the difference between their propagation constants (units of inverse length). $\lambda_o$ is the wavelength of the optical carrier signal. The information signal to be filtered is modulated onto the optical carrier signal. Vertical coupling between waveguide and microdisk can be controlled via a tuning of the index-difference $\Delta n_{eff}$.

In particular, one can vary $\Delta\beta = 2\pi\Delta n_{eff}/\lambda_o$ by controlling the difference in effective refractive index ($\Delta\beta n_{eff}$) between the mode circulating in the microresonator and that propagating in the waveguide. Values of $\kappa_c$ and $\Delta\beta$, for illustrative purposes only, may be in the order-of-magnitude range 1-100/cm, or some other range depending on the wavelength of the optical carrier signal, the index-of-refraction difference, and other factors.

In some embodiments, tuning of the index-difference $\Delta n_{eff}$ can be accomplished with the use of carriers injected through tuning-electrodes placed at the two optical coupling junctions. Under carrier injection, the effective index $n_{eff}$ of the Si microdisk is changed locally via the Kramers-Kronig relations, as detailed in Soref and Bennett, "Kramers-Kronig analysis of electro-optical switching in silicon," *Proc. SPIE*, vol. 704, pp. 32-37.

As illustrated in FIG. 3, it is possible to deposit contact-pads to the implanted $P^+$ regions at the top, and $N^+$ regions at the disk's periphery, to form these electrodes. In some embodiments, a second pair of electrodes (labeled bias-electrodes in FIG. 2) is placed at (or about) 90° from the coupling junction to control the resonance frequency of the Si microdisk. For example, the carriers injected through the bias-electrode can be decreased to counteract an increase of carriers at the coupling junction, thereby keeping the resonance frequency $(\omega_o)_R$ about constant during tuning of evanescent coupling (see EQ. 1).

It is estimated that an injected carrier density on the order of $10^{16}$ cm$^{-3}$ is sufficient to accomplish $\Delta n_{eff}$ on the order of $10^{-4}$ for a tuning of the filter's center frequency and a reconfiguration of its passband characteristics. Of course, other injected carrier densities can be used, depending on the desired $\Delta n_{eff}$ and on system properties. Preferred embodiments allow control of the resonant frequency and the coupling between the waveguides and the microresonator.

Methods of programming a microdisk as a first-order IIR filter will now be described in accordance with the coupling characteristics of the microdisk. By summing the recirculating fields in the resonator, a person of ordinary skill can show that its throughput ($E_e/E_i$) and dropped-output ($E_d/E_i$) are given by the following equations:

$$\frac{E_e}{E_i} = \frac{t_1 - \alpha \cdot t_2^* z^{-1}}{1 - \alpha \cdot t_1^* t_2^* z^{-1}} \quad \text{(EQ. 2)}$$

$$\frac{E_d}{E_i} = \frac{\sqrt{\alpha} \cdot K_1 K_2 z^{-1/2}}{1 - \alpha \cdot t_1^* t_2^* z^{-1}} \quad \text{(EQ. 3)}$$

In EQS. 2 and 3, $z^{-1} = e^{j\omega_o \tau_R}$ and $\alpha$ denote, respectively, the phase-change and transmission coefficient for a single round-trip (of time-delay $\tau_R$) in the microresonator at the optical frequency $\omega_o$. Both magnitude and phase of $\alpha$ can be controlled via carrier injection in preferred embodiments. $K_1$ and $K_2$ denote, respectively, the coupling matrix-elements between the microresonator and its bus/drop waveguides, while $t_i$, given by $K_i^2 + t_i t_i^* = 1$, provides the corresponding transmission (diagonal) matrix element at the coupling-junctions. Specifically, the coupling matrix-element $K_i$ is related to $\kappa_c$ of EQ. 1 by $K_i^2 = P(L_c)/P_i$. In these equations, * indicates the complex conjugate, t is the transmission coefficient or throughput of the waveguide, $\alpha$ is the round-trip transmission coefficient of the microresonator disk, and $z^{-1}$ is a unit-delay variable common in discrete filtering.

EQS. 2 and 3 show that the throughput ($E_e/E_i$) and dropped-output ($E_d/E_i$) of the microresonator have the form of a first-order Infinite Impulse Response (IIR) filter. Using the carrier tuning mechanisms described above, both the center-frequency and coefficients of this IIR filter can be varied.

Figure 4:
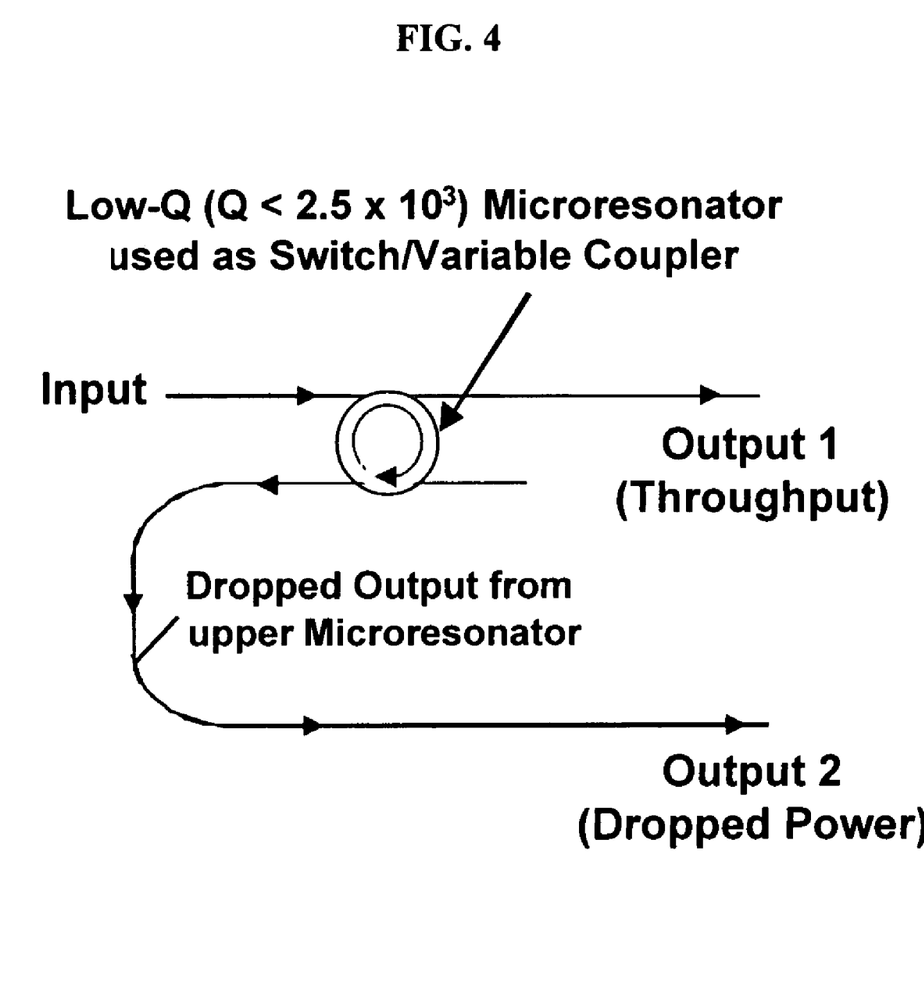
FIG. 4 illustrates how a microresonator can be used to split an optical input of the unit cell into two branches that have variable split-ratios.

FIG. 4 shows how a microresonator can be used to split an optical input of the unit cell into two branches that have variable split-ratios. The output ports 1 and 2 correspond, respectively, to the throughput and drop-port of the microresonator. In the expression "1:f," 1 refers to the input power, f refers to the fraction of input power on one output and 1-f is the fraction of the power on the other output. Thus, the coupling-tunable microdisk of FIG. 4 is a 1:f variable coupler.

Figure 5:
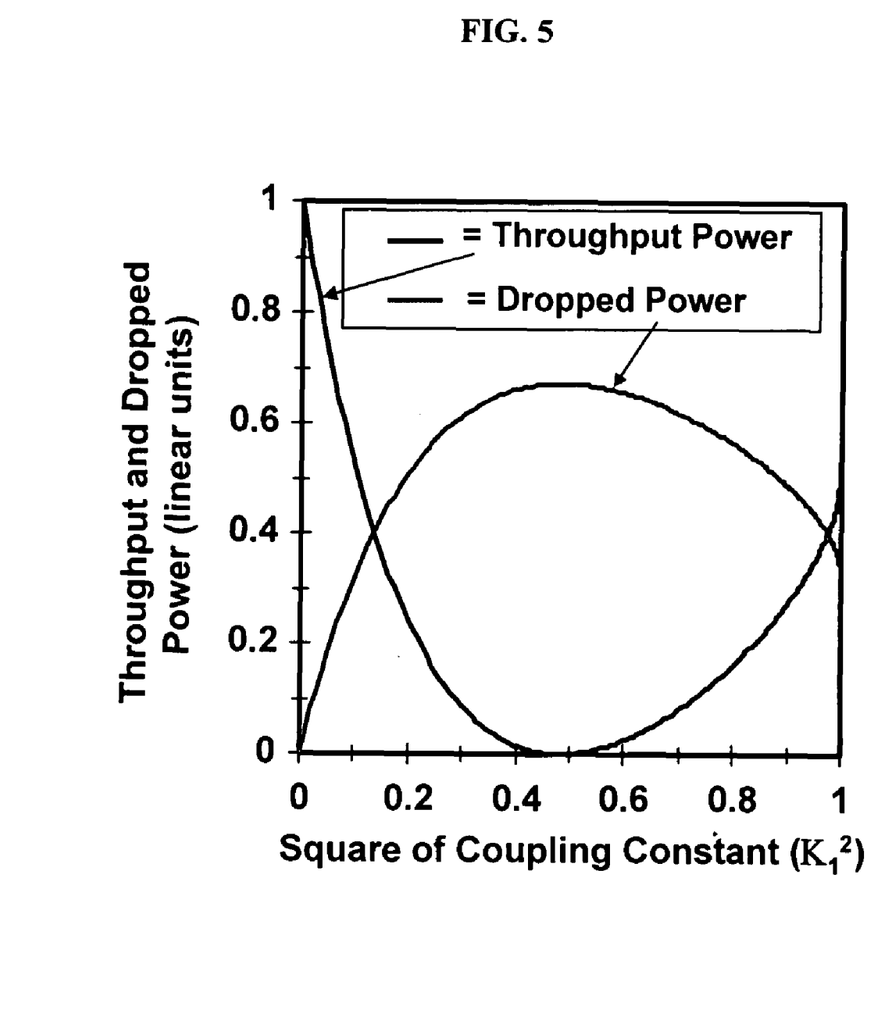
FIG. 5 depicts how the output powers of the throughput and drop-port can be varied by tuning $K_1$, in accordance with EQ. 2 and EQ. 3.

In FIG. 5, it is shown how the output powers of the throughput and drop-port can be varied by tuning $K_1$, in accordance with EQ. 2 and EQ. 3. The variable splitting is accomplished by tuning (via carrier injection) the coupling constant $K_1$ at the input coupling-junction of microdisks. Curves are shown of throughput and dropped power from a microdisk as a function of $K_i^2$, implying the control of output powers via tuning of the coupling constant $K_i$.

Preferably, fabrication for this variable coupler is compatible with the rest of the unit cell, so that one can integrate the couplers as 1:f splitters/combiners at the input/output of the unit cells. In addition to using a variable coupler based on the microdisk, waveguide directional couplers can also be used to split the optical input to the unit cell in alternate implementations. Using directional couplers, a 2×2 transfer matrix M with matrix elements $M_{11} = M_{22} = \cos\theta$, $M_{12} = M_{21} = j\sin\theta$ can set the split-ratios of the optical input.

The unit cell provided by the invention can be utilized to form a programmable second-order IIR filter with two poles and two zeros. The unit cell preferably comprises two microresonators, each operating on a fraction of the signal coming from a 1:f coupler. The 1:f couplers consist essentially of microresonators with appropriate values for the control inputs (the PIN diodes). As shown in FIG. 1, light enters the unit cell via a 1:f splitter. After splitting, it is coupled into two microdisks that serve as programmable IIR filters (of the first order). For cascading the cells in one dimension (see FIG. 6), only the throughputs of the microdisks are used.

Figure 6:
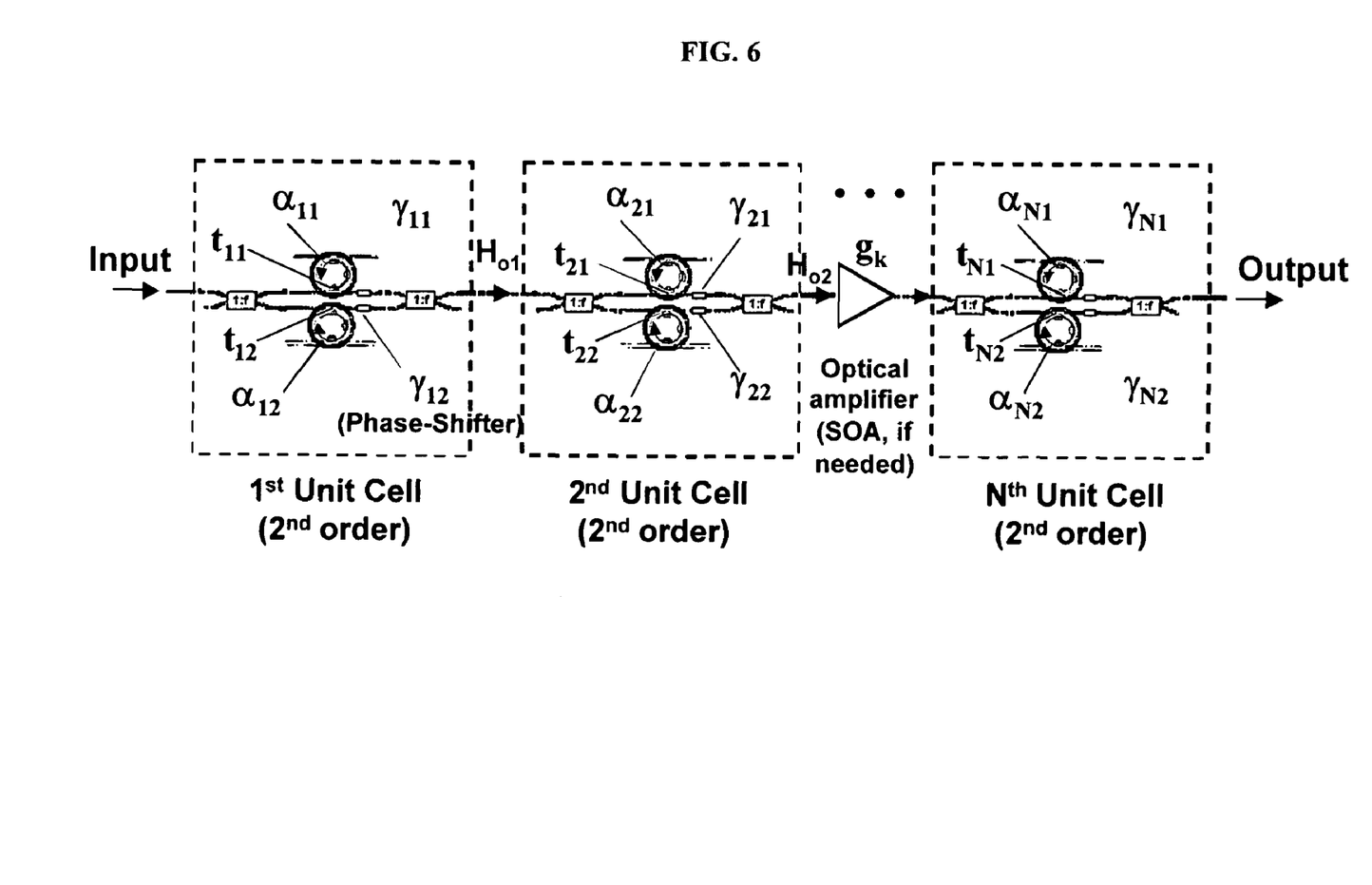
FIG. 6 illustrates formation of higher-order tunable bandpass-filters through the cascading of unit cells, in some embodiments.

FIG. 6 illustrates formation of higher-order tunable bandpass-filters via the cascading of unit cells. Each unit cell consists of two programmable microdisks. N unit cells are cascaded to form a higher-order integrated filter structure. The number N is preferably determined by the final passband-width and passband-rejection desired in a specific application. Generally speaking, for a given filter type, the narrower the passband-width or the larger the passband-rejection desired, the higher the number of cascades preferably employed. Therefore, a wide range of N can be employed, depending on the system specification; the present invention is not limited to any particular value or range of values for N.

As shown, each of the microdisk's throughput is fed to a Si phase-shifter. The differential phase-shift between these two phase-shifters $\delta_i$ ($=\gamma_{i2}-\gamma_{i1}$) embodies an additional programmable parameter in the unit cell. After the phase-shifters, the two arms of the interferometer are combined in a second 1:f coupler. For equal splitting between the two arms via directional couplers—i.e., f=1, $\theta=\phi=\pi/4$, where $\theta$ and $\phi$ determine (see definition above), respectively, the matrix M for the input and output coupler—the two outputs (denoted $P_{11}$ and $P_{12}$ in FIG. 1) are power complementary.

For an arbitrary splitting ratio set by $\theta$ and $\phi$ in 2×2 directional couplers, the transfer function $H_{oi}$ at the top arm of the $i^{th}$ unit cell is a second-order filter given by:

$$H_{oi} = \frac{A_{io} + A_{i1} z^{-1} + A_{i2} z^{-2}}{1 + B_{i1} z^{-1} + B_{i2} z^{-2}} \quad \text{(EQ. 4)}$$

where $A_{io} = t_{i1} \cos\theta \cos\phi - e^{i\delta_i} t_{i2} \sin\theta \sin\phi$, $A_{i1} = \sin\theta \sin\phi (\alpha_{i2} + \alpha_{i1} t_{i1}^* t_{i2}) e^{i\delta_i} - \cos\theta \cos\phi (\alpha_{i1} + \alpha_{i2} t_{i1} t_{i2}^*)$, $A_{i2} = \alpha_{i1} \alpha_{i2} (t_{i2}^* \cos\theta \cos\phi - e^{i\delta_i} t_{i1}^* \sin\theta \sin\phi)$, $B_{i1} = -(\alpha_{i1} t_{i1}^* + \alpha_{i2} t_{i2}^*)$, and $B_{i2} = \alpha_{i1} \alpha_{i2} t_{i1}^* t_{i2}^*$. This filter is a discrete filter operating on an analog signal input amplitude-modulated on an optical carrier to produce the filtered output of the input analog signal.

Given a set of coefficients derived, for example, from the well-known Butterworth, Chebyshev, or Elliptic filters, the above equations offer sufficient degrees of freedom to solve for the optical parameters $t_{in}$, $\alpha_{in}$ (n=1, 2), $\theta$ and $\phi$, and $\delta_i$ that a person of ordinary skill in this art can use to form the filter. For the Butterworth, Chebyshev, or Elliptic filters, the coefficients $A_{im}$ (m=0, 1, 2) and $B_{in}$ (n=1, 2) are real. It can be deduced that $\alpha_{i1} = \alpha_{i2}^*$ and $\theta = \phi = \pi/4$. Hence, the input/output directional coupler can provide a 1:1 split. If the round-trip transmission $\alpha_{in}$ is denoted $\alpha_{in} = |\alpha_{in}| e^{j\psi_{in}}$, a skilled artisan can use $\psi_{in}$ to tune the filter's center frequency $(\omega_d)_c$ in the Z-domain (i.e., the $\omega_d$-domain). Transforming back to the analog s-domain ($s = j\omega_a$), the passband can be centered at a desired analog frequency $(\omega_a)_c$.

It should be noted that other mappings from the s-domain to the Z-domain are by no means precluded. One such alternate mapping that can be employed is the bilinear transform. The bilinear transform (also known as Tustin's method) is used in digital signal processing and discrete-time control theory to transform continuous-time system representations to discrete-time and vice versa. The bilinear transform is a first-order approximation of the natural logarithm function that is an exact mapping of the z-plane to the s-plane. When the Laplace transform is performed on a discrete-time signal (with each element of the discrete-time sequence attached to a correspondingly delayed unit impulse), the result is precisely the z-transform of the discrete-time sequence.

Figure 7:
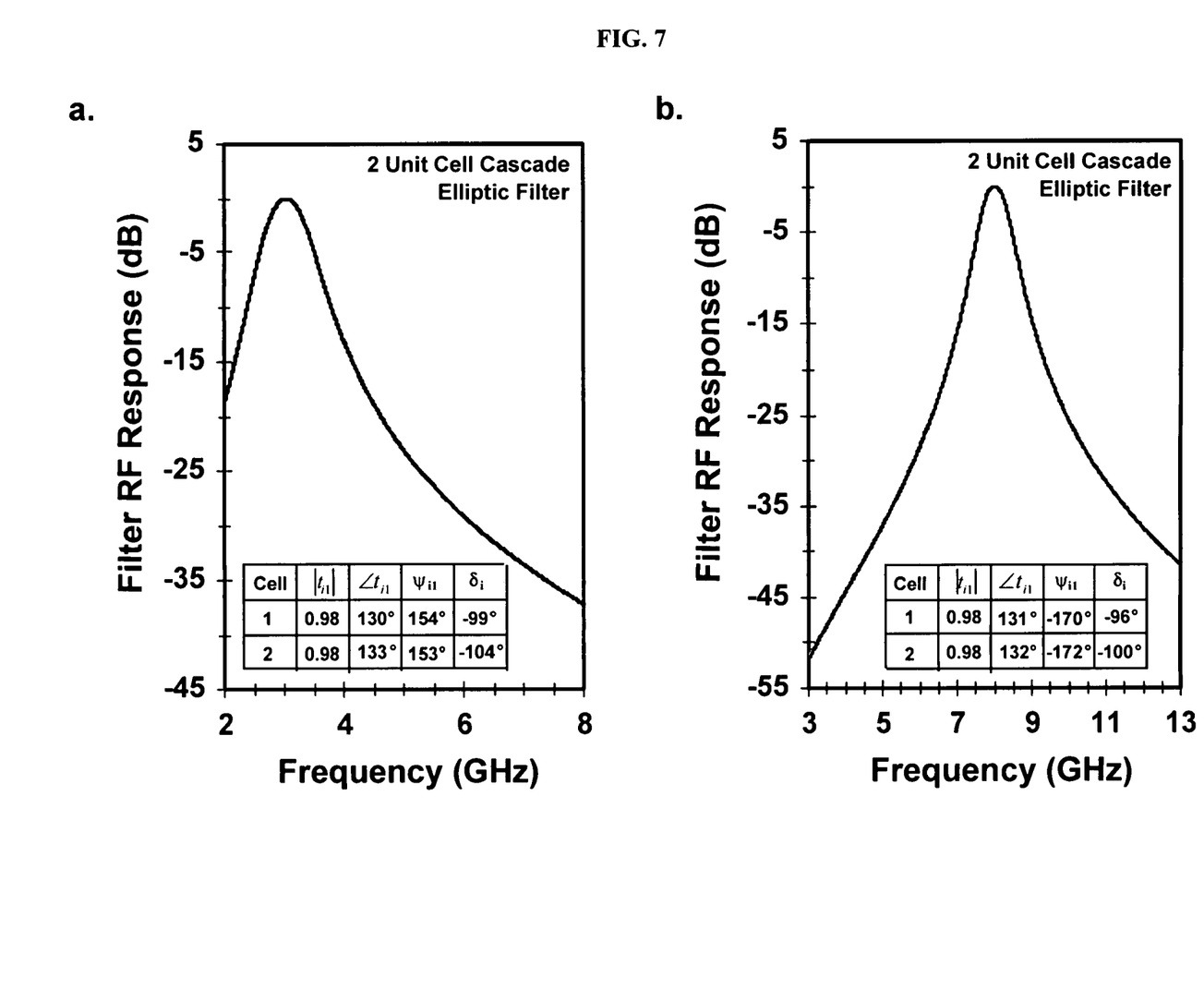
FIG. 7 shows the passband characteristics of Elliptic bandpass-filters formed by cascading two unit cells.

FIG. 7 shows the passband characteristics of Elliptic bandpass-filters formed by cascading two unit cells. The insets of FIGS. 7a and 7b show the optical parameters derived from the above equations in some embodiments. Specifically, here $\psi_{in}$ tunes the center frequency of the bandpass filter from 3 GHz (in FIG. 7a) to 8 GHz (in FIG. 7b). This is an exemplary tuning.

Given certain preferred capacitance and carrier recombination times in the coupling-junctions of the microdisks, the reconfiguration time of the filter coefficients can be low, preferably less than one millisecond, more preferably less than 500 nanoseconds, and most preferably less than 100 nanoseconds. Reconfiguration times of <100 nsec are considered agile for RF-photonic filters, i.e., design filter coefficients can be adjusted at high speeds (such as 10 MHz or higher). Preferred embodiment herein can support a reconfiguration time of less than 100 nsec for the filter coefficients.

Figure 8:
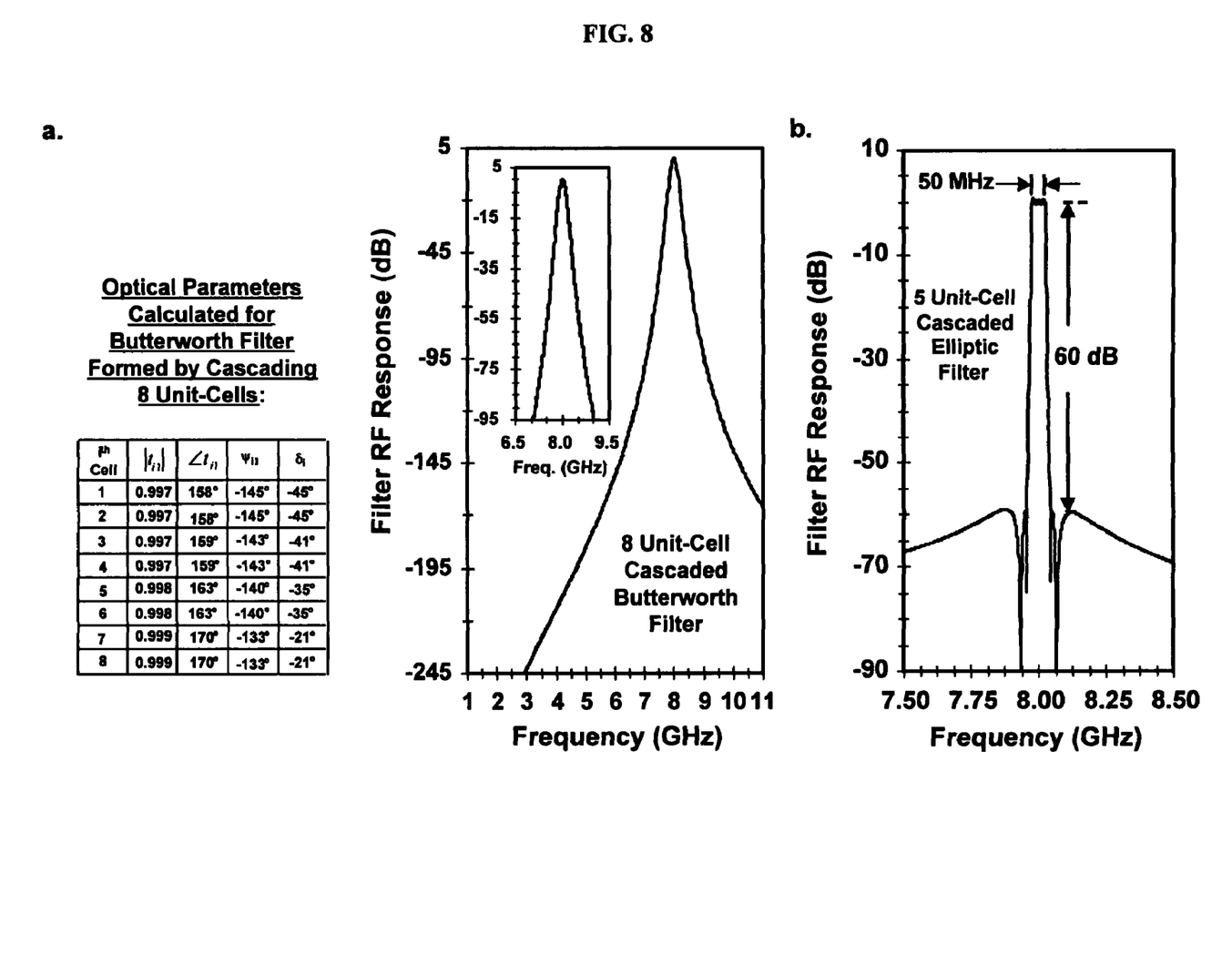
FIG. 8 depicts exemplary filter RF-responses obtained by cascading five to eight unit cells.

In FIG. 8, we show filter RF-responses obtained by cascading five to eight unit cells. FIG. 8a shows the RF-response obtained by cascading eight unit cells (i.e. i=1 ... 8 for EQ. 4) to form a maximally-flat Butterworth bandpass filter that has minimal ripple at its passband. The inset shows the optical parameters derived in this embodiment for the 8 unit cells. FIG. 8b shows an Elliptic filter formed by cascading 5 unit cells designed using the methods described above. As shown, one obtains a bandpass response centered at 8 GHz, with a 50 MHz passband, and a 60-dB out-of-band rejection-ratio, about 25 MHz away from the passband edge. The passband ripple for this particular elliptic filter design is only about 1 dB.

Figure 9:
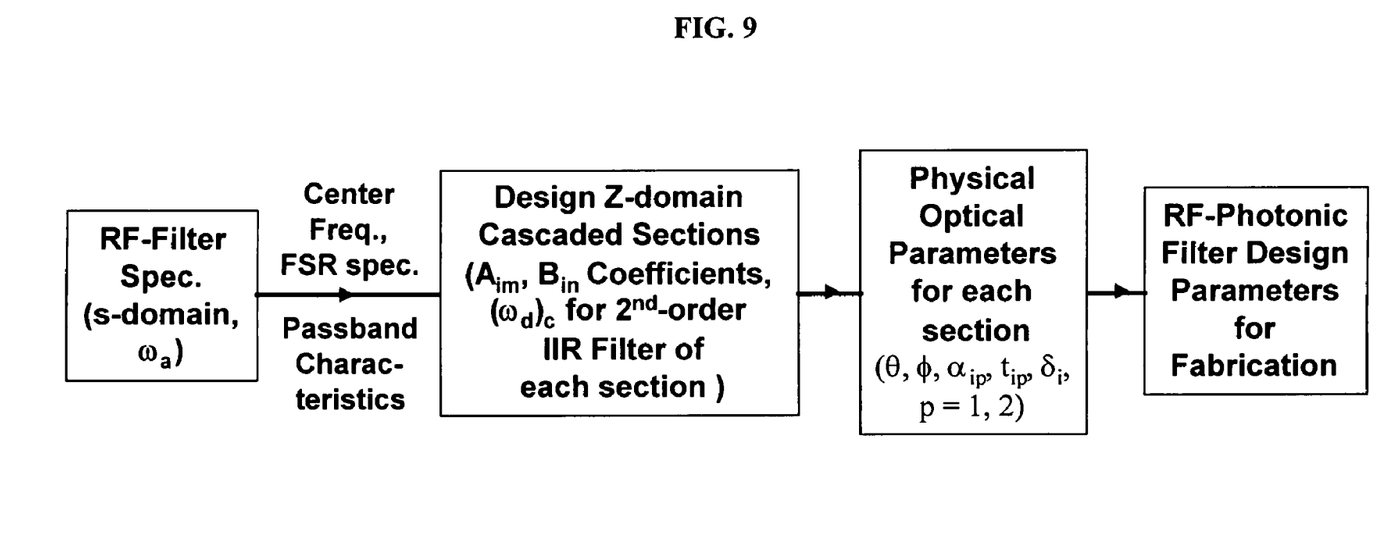
FIG. 9 presents a flowchart summarizing a synthesis procedure for a RF-photonic filter provided in some embodiments.

FIG. 9 presents a flowchart summarizing a synthesis procedure for the RF-photonic filter provided in some embodiments. This flowchart describes a method for synthesizing higher-order RF-photonic filters based on the cascading of the unit cell shown in FIG. 1. In FIG. 9, FSR=free spectral range, $\omega_a$=analog frequency, $\omega_d$=frequency in the z-domain, and the index i denotes the ith cascaded unit cell.

Figure 10:
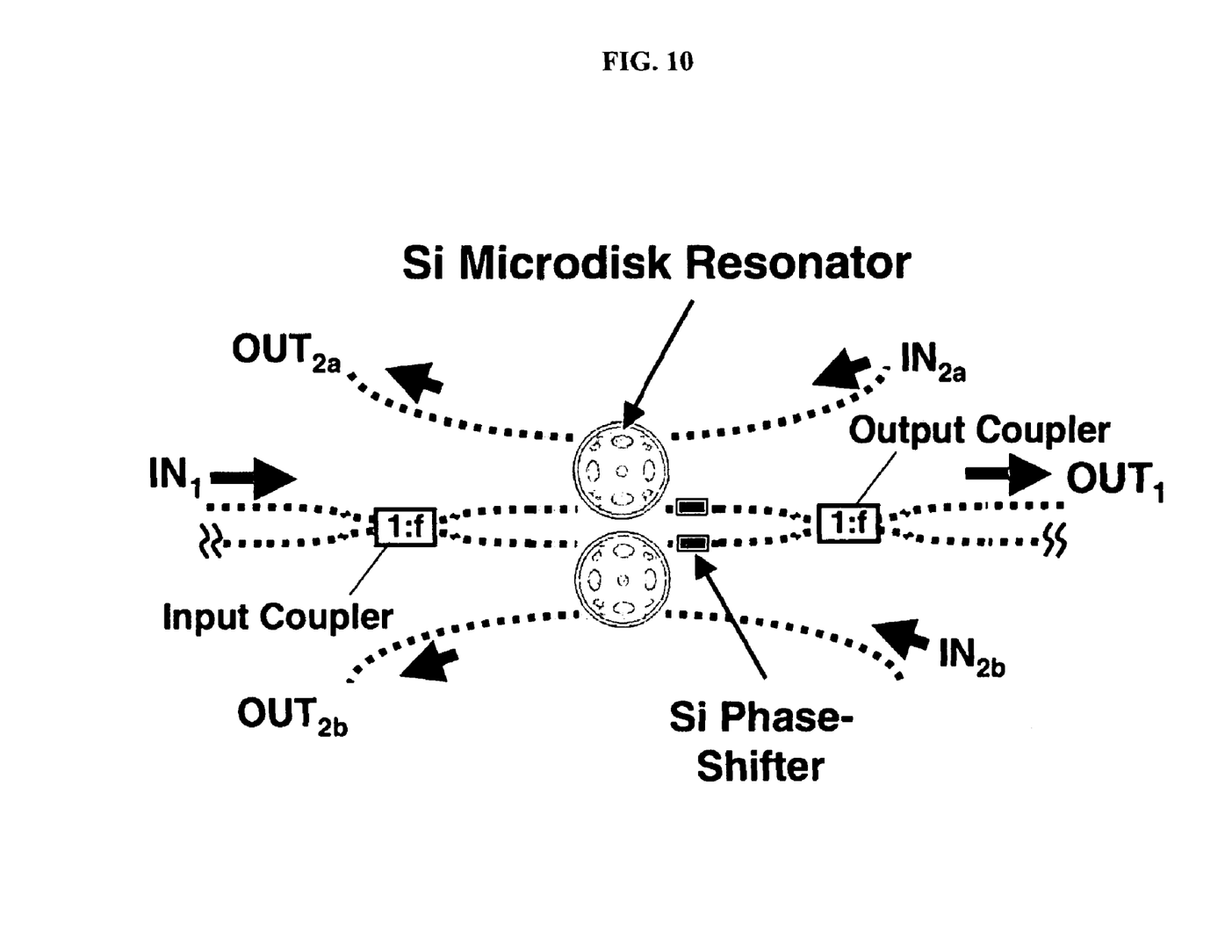
FIG. 10 illustrates use of a secondary coupling junction and inputs/outputs for the microdisks to accomplish two-dimensional connectivity and routing.
Figure 11:
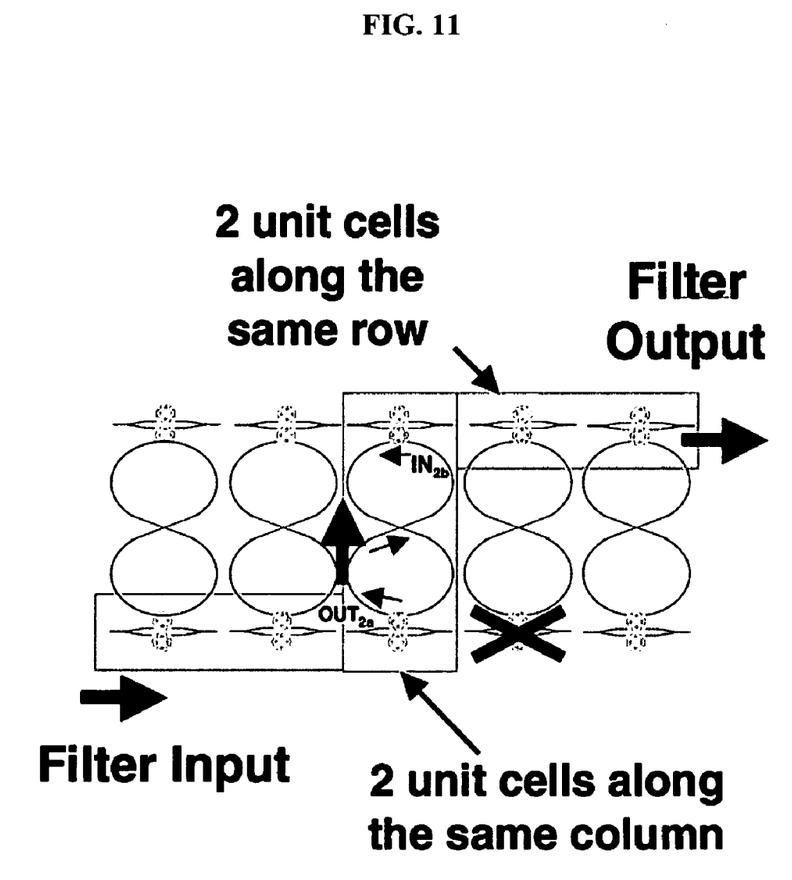
FIG. 11 depicts use of two-dimensional routing to bypass a known bad cell during the cascading of unit cells to form a higher-order filter structure.

With reference to FIGS. 10 and 11, the add/drop features of a microdisk can be utilized to effect two-dimensional connectivity in the lattice structure. FIG. 10 illustrates use of a secondary coupling junction and inputs/outputs for the microdisks to accomplish two-dimensional connectivity and routing. FIG. 11 depicts use of two-dimensional routing to bypass a known bad cell during the cascading of unit cells to form a higher-order filter structure.

A cell can be considered "bad" or non-functional if it is incapable of realizing a designed set of filter coefficients as set forth, for example, in EQ. 4 as $A_{im}$ and $B_{in}$. A cell can become non-functional for a variety of reasons. For example, the PIN diodes responsible for the carrier-injection (used for the tuning of the coupling coefficients or the resonance frequencies) can fail.

The capability of preferred embodiments to accomplish two-dimensional routing of optical signals enables additional agility in filter formation. In addition, cascading of unit cells provides for unit-cell redundancy to avoid known bad cells. Using the "drop" feature (cf. EQ. 3 and FIG. 5) intrinsic to these microdisks, a normally dormant secondary coupling-junction can be activated and routed to an optical input $IN_1$ (see FIG. 10) to a microdisk located in a neighboring row via $OUT_{2a}$ or $OUT_{2b}$. For the secondary output $OUT_{2a}$, this can be accomplished by applying the condition of critical coupling to the upper resonator of the unit-cell. At a neighboring unit cell located in the next row (but along the same column of the two-dimensional lattice), its secondary waveguide-inputs ($IN_{2a}$ or $IN_{2b}$) provide alternative paths to route light into this second unit-cell.

FIG. 11 shows that waveguide-paths between two unit cells lying along the same column direct light from the "drop-port" ($OUT_{2a}$) of the lower microresonator to the "add-port" $IN_{2b}$ of the upper microresonator. During this row-to-row routing of the optical input, one gains the additional benefit of cascaded Lorentzian (first-order) filtering: light is routed to a neighboring (upper or lower) row for higher-order filter formation. FIG. 11 illustrates, in addition, how a filter can be constructed by cascading unit cells along two neighboring rows in the lattice of a photonic integrated circuit (PIC), so that unit-cell redundancy can be achieved. In particular, FIG. 11 shows a routing arrangement that bypasses a known faulty cell (fourth cell of bottom row). Hence, the two-dimensional connectivity obtained via the add/drop capabilities of the microdisks offers redundancy for fault-tolerance in some variations of the invention.

The properties and characteristics of the microresonator elements used in various embodiments shall now be discussed further.

The size of the microresonator and the refractive index of its resonant optical mode determine the resonant frequencies of the microresonator, which are the frequencies of light that can be coupled efficiently into and out of the resonator element. Typically a number of microresonator elements are used cooperatively and would be disposed on a single substrate having optical waveguides therein.

Preferred microresonators herein comprise four electrodes, preferably (but not necessarily) equally spaced around the disk microresonator. As is known, an electrode is an electrical conductor used to make contact with a nonmetallic part of a circuit. The four electrodes of the microresonator can be referenced as electrode A, electrode B, electrode C and electrode D. Electrode B is over the input optical waveguide when the disk is used as described below. Electrode A is located over the output optical waveguide. Electrodes C and D are between the optical waveguides.

Each electrode consists of two contacts: a $P^+$ region and an $N^+$ region, which together form a PIN diode. A PIN diode (Positive Intrinsic Negative diode) is a diode with a wide, undoped intrinsic semiconductor region between p-type semiconductor and n-type semiconductor regions. Adjusting voltages applied to each PIN diode A, B, C and D allows a skilled artisan to control the coupling between the disk and the waveguides and the resonant frequency of the disk. The actual voltage sustained at the various PIN diodes can be, for example, on the order of 1 volt. Diodes A and B can control the optical coupling between the disk and the input and output optical waveguides, respectively. Diodes A+D and C+B control the resonant frequency. By selecting inputs for diodes A, B, C and D, filter coefficients for a second-order IIR filter can be adjusted.

In some embodiments, each microdisk includes four independent electrodes. For purposes of illustration, a unit cell with two microdisks will include a total of eight PIN diodes associated with the microdisks. There is preferably also a PIN diode associated with each phase-shifter in the unit cell. When there are two phase-shifters in each such unit cell, there will be ten PIN diodes in each cell, in some variations. Generally, "PIN diodes" as used herein means at least two PIN diodes.

While preferred embodiments have been described as providing a Si microresonator, other semiconductor materials can certainly be used, such as III-V semiconductors with a wider bandgap (e.g. GaAs or InP) than the photon energy of 1550-nm light, or semiconductor heterostructures (such as GaInAsP/InP or AlInAs/GaInAsP), or even II-V semiconductors. The chosen semiconductor should preferably exhibit low absorption at the incident optical wavelength of 1550 nm. In addition, photolithographic and etching technologies are available to the skilled artisan to fabricate a microdisk with smooth sidewalls from the chosen material, so that a good quality-factor (Q) can be attained at resonance.

Si is a preferred material for the microdisk of the invention, because use of Si renders it typically easier to fabricate a sidewall that is smooth enough to attain a high quality-factor (high Q) for the microdisk. In addition, wafer-bonding to an underlying silica-waveguide structure is generally easier with a Si microdisk. GaAs or InP have the advantage that the electro-optic effect can be used to tune the coupling and resonance-frequency for the microdisk.

Preferred embodiments of the present invention provide an integrated optical filter formed by coupling active microresonators to underlying waveguides that serve as low-loss optical interconnects between the microresonators. The integrated structure enables reconfigurable passbands with high rejection-ratios to be formed via the two-dimensional cascading of unit cells. Each unit cell is composed of microdisks (preferably Si) that have electrodes for coupling-control and the tuning of resonance frequencies, active phase-shifters (preferably Si), as well as input/output optical couplers.

The rejection-ratio of a bandpass filter is typically defined as the ratio (in dB scale) of the maximum of the passband to the highest sidelobe outside of the passband. Generally speaking, sidelobe suppressions (outside the bandpass) of greater than about 30 dB are considered high rejection-ratios.

In particular, the microdisks and phase-shifters can be heterogeneously integrated, such as by oxide-bonding, to underlying silica waveguides that exhibit low losses of less than about 0.05 dB/cm. A unit cell can form a second-order IIR filter whose coefficients can be programmed electrically and agilely by tuning: (i) the coupling between microdisk and its add/drop waveguides, (ii) a differential phase-shift δ, (iii) the round-trip transmission inside the microdisks, and (iv) variable optical splitting/combining at the unit cell's input/output. Two-dimensional connectivity between the unit cells is accomplished by reconfiguring the add/drop coupling obtained in the microdisks.

A basic filtering block as described herein can be cascaded horizontally as show in FIG. 6 to form a higher-order filter which may be Butterworth, Chebyshev, or any other filter as may be desired. In addition, the basic filtering block can be cascaded vertically to form a structure capable of filtering several inputs.

The disclosed filter structure can be utilized for the narrow-band channelization of RF signals that have been modulated onto optical carriers. Channelizing, or channelization, is generally the division of a single wide-band (high-capacity) communications channel into many relatively narrow-band (lower-capacity) channels. As used herein, channelization specifically refers to the filtering or division of a broadband microwave or RF signal into narrower frequency-bands or channels. This filtering or channelization step is typically utilized in defense systems to improve the signal-to-noise ratio of an RF emission one wants to detect and identify.

Through tuning filter coefficients, as fully described in the present disclosure, a person of ordinary skill can first search with a broad passband and then narrow down the filter to acquire more-precise signatures of the RF emission. Making the filter coefficients programmable can also allow tuning of the filter-passband from one center frequency to another (such as in FIG. 7, from 3 GHz to 8 GHz). The "hopping" of the filter passband allows one to search for RF-emission over a broad RF-spectrum (e.g. over about 10 GHz) with high resolution and a good signal-to-noise ratio.

In the chip-scale implementation of a coherent-AM frequency-channelizer, a broadband (e.g. 20-60 GHz) signal can be channelized into frequency-bins less than 100 MHz wide (cf. FIG. 8) with a series of microdisks or unit cells cascaded to form the disclosed tunable filter structure. The disclosed tunable filter structure can support frequency-agile channelization applications. In particular, the filter response obtained from cascaded unit cells can attain much higher band-rejection than the Lorentzian passbands of individual microdisks.

The integrated filter structures disclosed herein can also be utilized in wavelength division multiplexed telecommunication networks to accomplish practical, high-speed wavelength add/drop. Wavelength division multiplexing (WDM) is the process of carrying light of multiple wavelengths within a fiber. The fiber can carry the several channels without interference. WDM combines multiple optical signals so that they can be amplified as a group and transported over a single fiber to increase capacity. At the receiving end of the fiber, the information carried on the several channels is taken off of the fiber and separated into its several channels and recombined based upon destination.

Optical channels can be separated and recombined through the phenomena known as refraction and diffraction. Many WDM multiplexers and de-multiplexers in current use, such as arrayed waveguide gratings (AWGs), are complex to fabricate, bulky in size, and relatively costly. The AWG consists of a number of arrayed channel waveguides that act together like a diffraction grating in a spectrometer. The grating offers high-wavelength resolution. Other de-multiplexers include traditional dispersive devices, such as diffraction gratings and prisms. While being simpler and less expensive than AWGs, these devices typically have an angular dispersion less than one degree per nm, which prevents them from being sufficiently compact for most applications. Regardless of the configuration, because of their dependence on geometry, these routers are very sensitive to temperature and generally to shock, and thus not commercially convenient.

In order to practically utilize the presently described integrated filter structures in WDM telecommunication networks, a router is beneficial. A person of ordinary skill in the art will recognize that the present invention can conveniently provide a WDM router capable of sensing a wavelength within a channel carrier (e.g., an optical fiber) from a WDM transmitter at a source and further capable of placing the information to the intended WDM receiver destination. Namely, an array of unit cells as provided and fully described herein can form a programmable optical switching matrix, through selection of suitable parameters.

By appropriate programming, N optical inputs can be routed and combined to M optical outputs. The re-programming time should be made to be as small as possible, within the limits of design and economics. In general, the microresonator-based wavelength demultiplexers provided by the present invention are much smaller in form-factor than the array waveguide grating (AWG) demultiplexers employed in present systems, among other advantages as will be appreciated.

In this detailed description, reference has been made to multiple embodiments and to the accompanying drawings in which is shown by way of illustration specific exemplary embodiments in which the invention may be practiced. These embodiments are described in sufficient detail to enable those skilled in the art to practice the invention, and it is to be understood that modifications to the various disclosed embodiments may be made by a skilled artisan.

The embodiments, variations, equations, and figures described above should provide an indication of the utility and versatility of the present invention. Of course, many more devices can be developed that involve combinations of device elements as provided herein. Other embodiments that do not provide all of the features and advantages set forth herein may also be utilized, without departing from the spirit and scope of the present invention. Such modifications and variations are considered to be within the scope of the invention defined by the appended claims.

What is claimed is:

1. A unit cell comprising first and second active programmable microdisks, first and second active phase shifters, first and second input/output optical couplers, first and second input/output waveguides vertically wafer-bonded to said first microdisk, and third and fourth input/output waveguides vertically wafer-bonded to said second microdisk, wherein said first input/output optical coupler splits an optical signal entering said unit cell into said second and third waveguides, wherein said second input/output optical coupler is in optical communication with said first and second phase shifters, and wherein each of said first and second microdisks includes two tuning-electrodes and two bias-electrodes.

2. The unit cell of claim 1, wherein for each of said first and second microdisks, said tuning-electrodes are configured with PIN diodes suitable for carrier injection to adjust a refractive index difference, and wherein said bias-electrodes are configured with a second PIN diodes suitable for carrier injection to adjust a microdisk resonance frequency.

3. The unit cell of claim 1, wherein said first active phase shifter is heterogeneously integrated with said second input/output waveguide and wherein said second active phase shifter is heterogeneously integrated with said third input/output waveguide.

4. The unit cell of claim 3, wherein said first active phase shifter is wafer-bonded to said second input/output waveguide, and wherein said second active phase shifter is wafer-bonded to said third input/output waveguide.

5. The unit cell of claim 1, wherein each microdisk provides a throughput and a dropped output suitable for a programmable first-order infinite impulse response filter.

6. The unit cell of claim 1, wherein said microdisks are fabricated from semiconductors.

7. The unit cell of claim 1, wherein said microdisks are substantially Si.

8. The unit cell of claim 1, wherein said phase shifters are fabricated from semiconductors.

9. The unit cell of claim 1, wherein said phase shifters are substantially Si.

10. The unit cell of claim 1, wherein each of said first, second, third, and fourth input/output waveguides exhibit signal losses of less than 0.05 dB/cm.

11. The unit cell of claim 1, wherein the differential phase-shift between said first and second active phase shifters is programmable.

* * * * *